United States Patent [19]

Antelman

[11] Patent Number: 5,211,855
[45] Date of Patent: * May 18, 1993

[54] METHOD OF TREATING WATER EMPLOYING TETRASILVER TETROXIDE CRYSTALS

[75] Inventor: Marvin S. Antelman, Rehovot, Israel

[73] Assignee: N. Jonas & Co., Inc., Bensalem, Pa.

[ * ] Notice: The portion of the term of this patent subsequent to May 21, 2008 has been disclaimed.

[21] Appl. No.: 825,623

[22] Filed: Jan. 24, 1992

[51] Int. Cl.$^5$ .............................. C02F 1/50
[52] U.S. Cl. .................... 210/758; 210/764; 422/28; 424/618
[58] Field of Search .......... 210/169, 198.1, 501, 210/764, 758; 422/19, 28; 424/601, 602, 604, 618, 709; 514/495; 423/42, 45, 544, 604

[56] References Cited

U.S. PATENT DOCUMENTS

| | | | |
|---|---|---|---|
| 4,055,655 | 10/1977 | Maurer et al. | 514/495 |
| 4,092,245 | 5/1978 | Franks et al. | 210/169 |
| 4,492,618 | 1/1985 | Eder | 210/764 |
| 5,017,295 | 5/1991 | Antelman | 210/764 |
| 5,073,382 | 12/1991 | Antelman | 210/169 |
| 5,078,902 | 1/1992 | Antelman | 210/764 |
| 5,089,275 | 2/1992 | Antelman | 210/169 |
| 5,098,582 | 3/1992 | Antelman | 210/764 |

OTHER PUBLICATIONS

Hawley's Condensed Chemical Dictionary, 11th ed, p. 699 (definition of Ligand).
Hammer & Kleinberg Inorganic Synthesis vol. IV, p. 12.
J. Servian & H. Buenafama, Inorg. NUC. Letters 5, 337.

*Primary Examiner*—Peter Hruskoci
*Assistant Examiner*—Robert James Popovics
*Attorney, Agent, or Firm*—Salter, Michaelson & Benson

[57] ABSTRACT

A novel molecular scale device is described which is bactericidal, fungicidal and algicidal. The antipathogenic properties of the device are attributed to electron activity indigenous to diamagnetic semiconducting crystals of tetrasilver tetroxide ($Ag_4O_4$) which contains two monovalent and two trivalent silver ions in each molecular crystal. When the crystals are activated with an oxidizing agent, they release electrons equivalent to $6.4 \times 10^{-19}$ watts per molecule which in effect electrocute pathogens. A multitude of these devices are effective at such low concentrations as 0.3 PPM where they car kill 100% of 100 K/cc Streptococcus faecalis, and E. coli colonies in three minutes meeting the ten-minute EPA criteria of 100% kills within ten minutes for swimming pool and hot-tub applications. The devices can be used in utilitarian bodies of water, such as municipal and industrial water reservoirs.

4 Claims, 1 Drawing Sheet

METHOD OF TREATING WATER EMPLOYING TETRASILVER TETROXIDE CRYSTALS

BACKGROUND OF THE INVENTION

The present invention relates to the employment of molecular crystals as bactericidal, viricidal and algicidal devices, but more particularly to the molecular crystal semiconductor tetrasilver tetroxide $Ag_4O_4$ which has two trivalent and two monovalent silver atoms per molecule, and which through this structural configuration enables electronic activity on a molecular scale capable of killing algae and bacteria via the same mechanism as macroscale electron generators. The concept of molecular scale semiconductor devices for the storage of information has been the subject of much activity in recent years so that the concept of a molecular scale device performing such functions as storing information or acting as resistors, capacitors or photovoltaic devices is well accepted. The molecular device of this invention is a multivalent silver diamagnetic semiconductor. The bactericidal activity of soluble divalent silver (Ag II) complex bactericides is the subject of U.S. Pat. No. 5,017,295 of the present inventor. The inventor has also been granted U.S. Pat. Nos. 5,078,902, 5,073,382, 5,089,275, and 5,098,582, which all deal with Ag II bactericides but more particularly with (respectively) halides, alkaline pH, stabilized complexes and the divalent oxide. It is U.S. Pat. No. 5,098,582, and its perfection that has led to the present invention. This patent designated AgO as divalent silver oxide, the popular name of the compound. Indeed, the Merck Index (11th Edition) designates the oxide as silver(II) oxide (AgO) (entry 8469). However, it also states that it is actually a silver(I)-silver(III) oxide with a molecular weight of 123.88. After filing my patent application, a comprehensive examination was begun of information relating to the structure of this oxide. Further investigation of the scientific literature revealed that said oxide was actually on a molecular level $Ag_4O_4$ where one pair of silver ions in the molecule was trivalent and another pair was monovalent. Said oxide is actually on a molecular level $Ag_4O_4$ where one pair of silver ions in the molecule is trivalent and another pair is monovalent.

While the formula AgO accurately designates the silver:oxygen ratio, the molecular weight of the compound is actually 495.52. Further elucidation of the molecule's electromagnetic properties revealed that it is a diamagnetic semiconductor. The structure is electronically active because of the trivalent $sp^2$ electron configuration disparity of the electrons within the crystal. The oxide as presented in my patent was actually capable of killing 100% of standardized *E. coli* and *Strep. faecalis* colonies in less than five minutes at concentratiors of 0.5 PPM. My independent evaluations of this oxide in areas unrelated to water treatment resulted in the "molecular device" concept which was substantiated by submission of the oxide for testing with a preferred embodiment of the invention (10 PPM of sodium persulfate) at an Environmental Protection Agency (EPA) certified laboratory which revealed that 0.5 PPM of oxide only yielded 0.003 PPM of silver in solution, a silver concentration entirely too low to cause this level of bactericidal activity. Indeed, the killing of the bacteria was analogous to that obtained by electron generating devices utilized in swimming pools or water towers for killing bacteria. It was therefore postulated that the oxide efficacy at low concentrations could only be attributed to regarding each oxide molecule as a device. Further testing was continued on algae and viruses. The accumulated data of efficacy at low concentrations, coupled together with a reinterpretation of silver oxide efficacy, has led to the final development of this invention, namely, a molecular device for killing algae, bacteria and viruses in utilitarian water bodies, such as swimming pools.

OBJECTS OF THE INVENTION

The main object of this invention is to provide for a molecular scale device of a single tetrasilver tetroxide semiconductor crystal capable of killing viruses, bacteria, and algae when operating in conjunction with other such devices.

Another object of the invention is to provide for a device which is so small that several thousand trillion can be added to a water supply to perform their effective functions and still be effective at concentrations of the devices in said supply not exceeding one part per million.

Still another object of the invention is to provide for a device which will perform the aforementioned antipathogenic functions without polluting the water supplies it is intended to purify, such as swimming pools, industrial cooling towers, hot tubs and municipal water supplies.

Still another object of the invention is to provide for a device which can be employed in swimming pools, hot tubs and other environments for these aforementioned functions in the presence of humans, without causing them respiratory and eye irritations and other nuisance effects characteristic of active sanitizers based on halogens such as chlorine, one such nuisance affect being the deterioration of bathing suits.

Other objects and features of the present invention will become apparent to those skilled in the art when the present invention is considered in view of the accompanying examples. It should, of course, be recognized that the accompanying examples illustrate preferred embodiments of the present invention and are not intended as a means of defining the limits and scope of the present invention.

SUMMARY OF THE INVENTION

This invention relates to a molecular scale device capable of destroying gram positive and gram negative bacteria as well as viruses and algae. Said molecular scale device consists of a single crystal of tetrasilver tetroxide. Several hundred thousand trillion of these devices may be employed in concert for their bactericidal, viricidal, and algicidal properties and applied to industrial cooling towers, swimming pools, hot tubs, and municipal water supplies.

The molecular crystals which are the subject of this invention are commercially available and can be prepared by reacting silver nitrate with sodium or potassium peroxydisulfate according to the following equation:

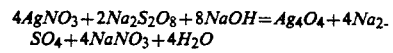

$4AgNO_3 + 2Na_2S_2O_8 + 8NaOH = Ag_4O_4 + 4Na_2SO_4 + 4NaNO_3 + 4H_2O$

The oxide lattice represented by the formula $Ag_4O_4$ is depicted in the Drawing FIG. 1. It is a semiconducting electron active diamagnetic crystal containing two monovalent and two trivalent silver ions in combination with four oxygen atoms. The distance between the Ag(III)-O Ag(I)O units equals 2.1 A. Ag(III)-Ag(III)-

=Ag(I)-Ag(I)=3.28A and Ag(I)-Ag(III)=3.19 A. Each trivalent silver ion is coordinated via $dsp^2$ electron bonds to 4 oxygen atoms. The depiction of this lattice is based on several literature references relating to crystallographic studies. Exemplary of this literature are J. A. McMillan's studies appearing in *Inorganic Chemistry* 13,28 (1960); *Nature* vol. 195 No. 4841 (1962), and *Chemical Reviews* 1962, 62,65. Alvin J. Salkind elucidated studies involving neutron diffraction with his coworkers (*J. Ricerca Sci.* 30, 1034 1960) proving the Ag(III)/Ag(I) nature of this molecule and states in his classic entitled *Alkaline Storage Batteries* (Wiley 1969), coauthored with S. Uno Falk, that the formula is depicted by $Ag_4O_4$ (page 156).

That same year a scientific communication appeared in *Inorganic Nuclear Chemistry Letters* (5,337) authored by J. Servian and H. Buenafama which maintained that their neutron diffraction studies also confirmed the tetroxide lattice and the presence cf Ag(III) and Ag(I) bonds in the lattice, a conclusion also reported previously by Naray-Szahn and Argay as a result of their x-ray diffraction studies (*Acta Cryst.* 1965, 19,180). Thus the effects of this invention can be explained in terms of these structural elucidations, namely, that the single molecular semiconductor crystal which inevitably must be electronically active exchanging two electrons per crystals between its mono and trivalent bonds is in reality a device which kills pathogens in the same manner as electrically active large-scale devices utilized in water supplies.

When the tetroxide crystals are utilized to destroy pathogens, they will not do so unless activated by an oxidizing agent. This is analogous to the behavior of single semiconducting photovoltaic molecular devices such as copper indium selenide whose surfaces must be "etched" in order to activate the photovoltaic activity, i.e., for light to facilitate the release of electrons from the molecule. The tetroxide was activated by persulfates. It was found that when the persulfates were tested as a control by themselves, they failed to exhibit any unilateral antipathogenic activity at the optimum level selected of 10 PPM. The persulfates evaluated varied from OXONE (Registered Trademark Du Pont Company) brand potassium monopersulfate to alkali peroxydisulfates.

DESCRIPTION OF THE DRAWING

In the drawing which illustrates the best mode presently contemplated for carrying out the present invention.

DESCRIPTION OF THE INVENTION

Figure 1:
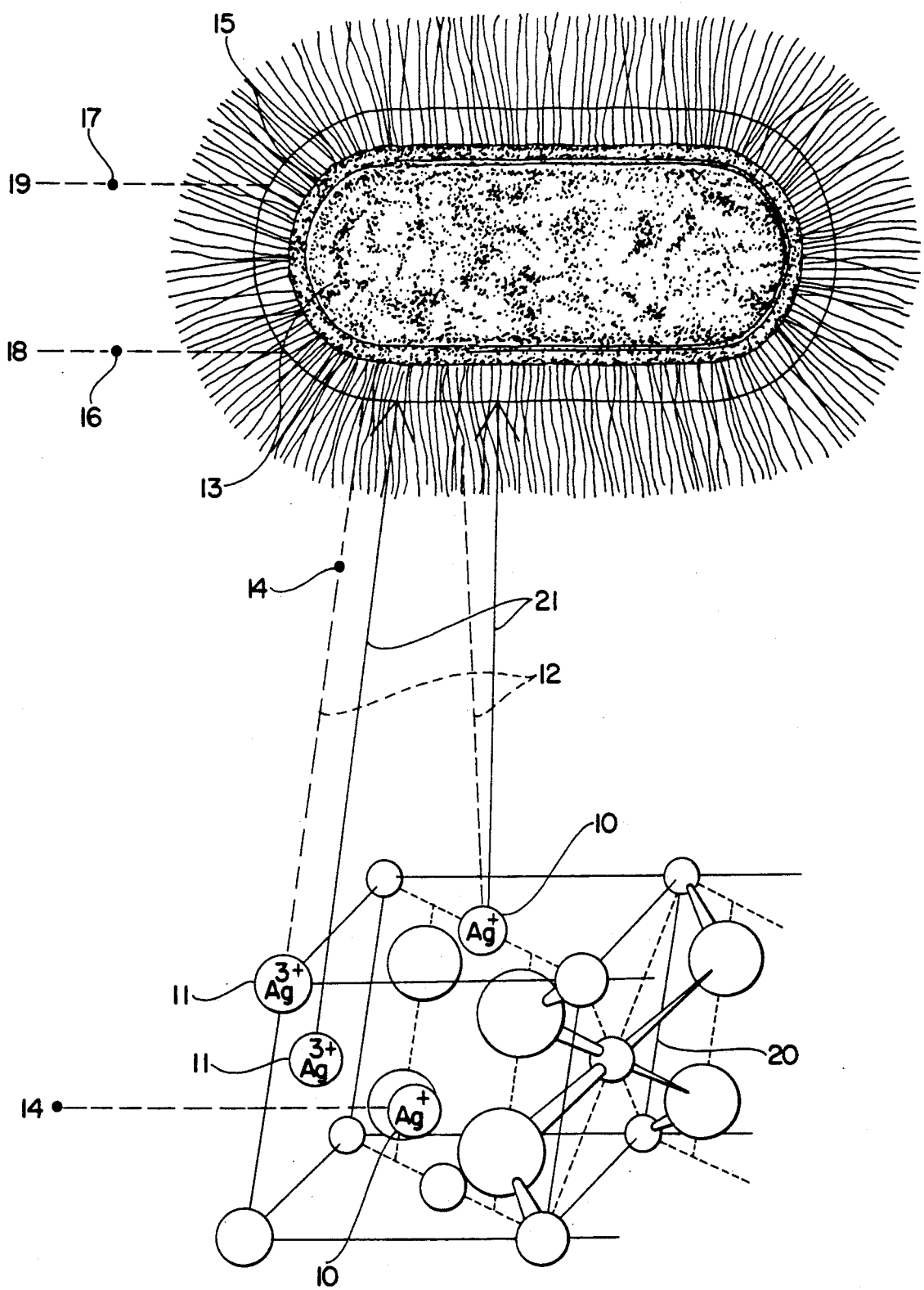
FIG. 1 is a diagrammatic view showing the molecular crystal $Ag_4O_4$ attacking a pathogenic bacillus.

Turning now to Drawing FIG. 1 depicting the crystal lattice of $Ag_4O_4$, the device operates by transferring electrons from the monovalent silver ions 10 to the trivalent silver ions 11 in the crystal 20 through the aqueous media in which it is immersed and which conducts electrons depicted by the path 12, contributing to the death of pathogen 13 with electrons 14, traversing the cell membrane surface 15, said pathogen being "electrocuted" by not only these electrons but by others: 16 and 17 following paths 18, and 19 emanating from other molecular devices in the vicinity of the pathogen. Drawing FIG. 1 exaggerates the size of the silver oxide molecular device with respect to that of a microorganism for depiction purposes only. The device is attracted to the cell membrane surface 15 by powerful covalent bonding forces 21 caused by the well-known affinity of silver to certain elements present in the membrane, such as sulfur and nitrogen.

The electron transfer can be depicted by the following half reactions in which the monovalent silver ion loses an electron and the trivalent silver gains one as follows:

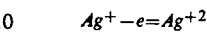
$$Ag^+ - e = Ag^{+2}$$

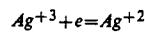
$$Ag^{+3} + e = Ag^{+2}$$

The molecular crystal then will become stabilized with each silver ion having a divalent charge.

The molecular device was evaluated in concentrations ranging from 0.5 to 5.0 PPM on mixed gram positive and gram negative cultures and mixed coliforms for evaluation in conjunction with EPA protocols for swimming pools in the presence of 10 PPM sodium persulfate. It killed 100% of colonies of Streptococcus faecalis and *E. coli* within three minutes at 0.5 PPM. The EPA requirement is within ten minutes. The colony concentrations were 100,000/cc.

In order to consider the possibility that silver ions escaping the crystal device may have had an influence on the bactericidal properties of the device especially if those silver ions were of a higher valence state facilitated by the persulfate according to the reaction:

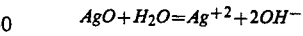
$$AgO + H_2O = Ag^{+2} + 2OH^-$$

$Ag_4O_4$ crystals were sent to an independent EPA certified testing laboratory together with sodium persulfate with specific instructions to prepare $Ag_4O_4$ suspensions in 10 PPM persulfate at various concentrations. The preparations were made in one-liter volumetric flasks utilizing 0.5 mg and other concentrations /L of $Ag_4O_4$, where the concentration of mg. per liter equals parts per million of the oxide. After vigorous mixing of the oxide crystals in the flasks, the solutions were allowed to remain undisturbed for 24 hours. After that time period the supernatant liquid was analyzed for silver utilizing atomic absorption spectroscopy with inductively coupled plasma. At 0.5 PPM $Ag_4O_4$ there was only silver found equivalent to 0.003 PPM. This concentration is so low that even if it were speculated that the ions were in a higher valence state, they could never even then be considered bactericidal. Indeed, the inventor's U.S. Pat. No. 5,017,295 involving divalent silver bactericides claims these compounds at the lowest silver ion concentration of 0.5 PPM.

If we are to consider one molecular device in operation, then each molecule would release two electrons having each a charge of $4.8 \times 10^{-10}$ e.s.u. equivalent to approximately $1.6 \times 10^{-19}$ coulombs. The EMF given in my *Encyclopedia of Chemical Electrode Potentials* (Plenum 1982), page 88, for the oxidation of Ag(I) to Ag(II) is 1.98 volts which approximates 2.0 V. The total power output per device can be calculated in watts by multiplying the power output for each electron by 2. Since power is the product of the potential times the charge, $P = EI$; for each electron it would be $$2.0 \times 1.6 \times 10^{-19} = 3.2 \times 10^{-19} \text{ watts}$$

From this, and using Avogadro's number, we can calculate that the power flux of one liter of solution containing 0.5 PPM of devices would be 0.064 watts. Since the electronic charges of the devices are directly proportional to the number of devices in solution, i.e., the concentration of the oxide in the solution, we can arbitrarily assign our own device power flux constant which can be used to gauge the concentrations of the devices required in order to kill particular organisms in specific environments. I have found the following formula useful for this purpose:

Power Flux = EMF generated per molecule × Concentration × 5

(the EMF being 4.0 volts per molecular device times the concentration in PPM). Utilizing this formula, the power flux to effectuate 100% kills for *E. coli* and *Streptococcus faecalis* is equal to 6.0.

Tests were conducted to see whether the molecular crystals posed any harm to the human body. Accordingly, a 3% concentrate of the crystals was prepared for a series of evaluations.

The first evaluation met the requirements of Code of Federal Regulations (CFR) 40 part 160 which consisted of determining the single dose toxicity in rats or $LD_{50}$. All the animals survived so that the $LD_{50}$ was greater than 5.0 g./Kg. This was true for concentrations of crystals of a magnitude of 6–60,000 times the actual concentrations that would be used in its utilization. This test classified the device as a category IV substance according to EPA protocols.

The second evaluation was for acute dermal toxicity in rabbits. The protocol, 40 CFR 158.135, 81-2, was to determine the $LD_{50}$ for dermal application. All animals survived the maximum dose 2.0 g/Kg., classifying the crystals as category III with a dermal $LD_{50}$ greater than 2000 mg/Kg.

The third evaluation, entitled "Primary Dermal Irritation in Albino Rabbits", conformed to 40 CFR 160. It consisted of exposing the rabbits for prolonged periods of time and observing edema, erythema, ulceration, necrosis and any other evidence of dermal reactions or tissue destruction. There were none, classifying the crystal concentrate as a category IV dermal agent by EPA criteria.

The fourth evaluation dealt with primary eye irritation. This also was in conformity with 40 CFR part 160. There was absolutely no eye irritation when the crystal concentrate was applied, classifying it as a category IV substance with regard to eye effects according to EPA criteria.

The concentrate submitted for these evaluations, i.e., the 3% suspension of crystals, represented a concentration 1.50% times as great as the end product intended for commercialization, namely, a 2% suspension of silver oxide crystals.

The crystals were also evaluated by monitoring their performance over a period of time at various concentrations. Periodically, water samples were taken and shipped in a refrigerated state for bacterial counts. Accordingly, the device performed in concert with its attendant devices in full conformity with the ultimate objects of this invention.

Other objects and features of the present invention will become apparent to those skilled in the art when the present invention is considered in view of the accompanying examples. It should, of course, be recognized that the accompanying examples illustrate preferred embodiments of the present invention and are not intended as a means of defining the limits and scope of the present invention.

EXAMPLE 1

Tetrasilver tetroxide ($Ag_4O_4$) crystals were prepared by modifying the procedure described by Hammer and Kleinberg in *Inorganic Syntheses* (IV,12). A stock solution was prepared by dissolving 24.0 grams of potassium peroxydisulfate in distilled water and subsequently adding to this 24.0 of sodium hydroxide and then diluting the entire solution with said water to a final volume of 500 ml. Into 20 ml. vials were weighed aliquots of silver nitrate containing 1.0 g. of silver. Now 50 ml. of the aforementioned stock solution were heated in a 100 ml. beaker, and the contents of one of the vials was added to the solution upon attaining a temperature of 85° C. The beaker was then maintained at 90° C. for 15 minutes. The resulting deep black oxide obtained consisting of molecular crystal devices was washed and decanted four times with distilled water in order to remove impurities. The purified material was collected for further evaluation and comparison with commercial material. The commercial material was purchased from Johnson Matthey's Catalog Chemicals Division of the Aesar Group of Ward Hill, Massachusetts, under product code 11607 and generically listed in its materials Safety Data Sheet as both silver peroxide and silver suboxide, having a purity of 99.9%.

Both the prepared and commercial device crystals were submitted for bactericidal evaluation following "good laboratory practice" regulations as set forth in Federal Regulations (FIFRA and ffdca/40 CFR 160, May 2, 1984). The protocols consisted of exposures to Streptococcus faecalis, a gram positive pathogenic bacillus utilizing AOAC (15th) 1990:965:13: at colony densities of 100 000 colonies/cc. and two exposure times of five and ten minutes. The devices were tested at concentrations of 0.3, 0.5 and 1.0 PPM in distilled water adjusted to pH=7.5 and containing Oxone (Registered Trademark Du Pont Company), which is potassium monopersulfate at a level of 10 PPM. The evaluations were repeated at the same persulfate concentration utilizing commercial grade sodium persulfate manufactured by FMC. 100% kills were actually obtained after three minutes at all the aforementioned device concentrations, there being actually zero colonies at the 0.5 and 1.0 PPM levels after five minutes and at the 0.3 PPM level after ten minutes. Analogous testing employing the same colony density of the gram negative bacillus *E. coli* were carried out. The same results were obtained. EPA criteria require that 100% kills be obtained within ten minutes for a substance to meet EPA criteria for swimming pool utilization. In this case, the devices at 0.3 PPM, equivalent to approximately 360,000 trillion devices, were able to far exceed EPA criteria for sanitizing a swimming pool.

EXAMPLE 2

Commercial grade silver oxide prepared according to the method of Example 1, but which is actually the tetrasilver tetroxide molecular devices were tested in a swimming pool under actual-use conditions. The swimming pool contained approximately 27,000 gallons of water. The level of the device crystal concentration was maintained at 1.0–1.5 PPM. The swimming pool was periodically monitored by removing water samples for pH, silver calcium, algae and bacteria. The swimming pool was utilized on a daily basis over a period of six weeks by an average number of four people per day. The pool was made up fresh with a fresh coating of plaster. The initial pH was 9.7. By the end of the first week, the pH dropped to 8.2. Thereafter the average daily pH of the pool was 7.8. The calcium level of the pool was allowed to rise slowly from an initial 100 PPM to 220-240 PPM. Without any new additions of silver to the solution of the initial 1.5 PPM molecular crystal concentration, the pool had zero bacteria and zero algae. Other extraneous factors were also monitored, such as copper (0.1-0.2 PPM) and iron (initial .0 average .05 PPM), which did not affect the results.

EXAMPLE 3

Tests were performed on residual silver concentration of device crystals in water to see whether the devices could be used to treat municipal drinking water supplies since the devices had proven to be antipathogenic at 0.3 PPM according to Example 1. Now there is no adverse health effect for silver at the present time according to the EPA, and it has been dropped from the 1991 pollutants list according to 56 FR 1470 p.7. A secondary maximum contaminant level for drinking water involving silver was proposed in 1989 (54 FR 22062), May 22, 1989) of 0.1 PPM. The oxidizing agent to activate the crystals for water supplies would be OXONE (Registered Trademark Du Pont Company) or hydrogen peroxide. Accordingly, brand potassium monopersulfate samples of commercial oxide devices of Aesar origin as heretofore described were sent to an EPA certified laboratory for evaluation. The laboratory prepared samples of the devices at concentrations of 0.5, 1.0, 2.0, 5.0 and 10.0 PPM in 10 PPM sodium persulfate solution. The solutions were allowed to stand for 24 hours, after which the supernatant liquid was tested for residual silver content by atomic absorption spectroscopy using inductively coupled plasma as the excitation source. The respective amounts of silver found in the supernatant liquid were respectively 0.003, 0.13, 0.52 and 0.94 PPM. This means that at a concentration of nearly double the pathogenic inhibition requirement level that the secondary silver allowance of 0.1 PPM was hardly reached, which qualifies the devices for drinking water.

EXAMPLE 4

The devices were tested against AIDS virus. The protocol used was that of the Ministry of Health of the State of Israel at their Virology Laboratory located at Tel HaShomer, Israel. AIDS viruses which had been grown in vitro in a tissue culture were isolated and exposed to the devices at device concentrations of 0.05, 1.0, 2.0, 3.0, 5.0 and 10.0 PPM. There was no evidence of AIDS suppression at all until the concentrations reached 5.0 and 10.0 PPM. At 5.0 PPM, 60% of the viruses were killed. AT 10.0 PPM, 75% of the viruses were killed. Extrapolation of this data reveals that at 18.0 PPM there would be total suppression of the virus. These test results indicate that the devices are capable of being used to destroy viruses in applications involving the proliferation and transmittal of the AIDS virus outside of the human body as in cold sterilization.

EXAMPLE 5

An ATTC strain of Chorella was grown in nutrient Medium 866 broth under the required lighting. When optimal growth was reached, the number of organisms per ml. were determined by microscopic count and then subcultured. The molecular crystal devices were applied to the algae at concentrations of 1 and 2 PPM. The algae were left in contact for one hour, one day and ten days. The protocol for these tests involved procedures described in the Water and Waste Water Manual of the United States Public Health Service. The exposure tests involved post inoculation in order to determine whether the devices were algicidal or algistatic. The oxidizing agent for activation was sodium persulfate at a concentration of 10 PPM. The devices were found to be algistatic at 1 PPM and algicidal at 2 PPM after one hour's exposure. After one day and ten days, there were no positive flasks at all. Ten flasks of subculture were utilized for each test, and only one flask was positive out of ten after one hour at 1 PPM.

While there is shown and described herein certain specific examples embodying the invention, it will be manifest to those skilled in the art that various modifications and rearrangements of &he invention may be made without departing from the spirit and scope of the underlying inventive concept and that the same is not limited to the particular forms herein shown and described except insofar as indicated by the scope of the appended claims.

What is claimed is:

1. A method for killing pathogens including bacteria, viruses and algae in utilitarian water bodies including the water of swimming pools, industrial cooling towers, hot tubs and drinking supply reservoirs, which comprises adding to the water a multitude of tetrasilver tetroxide molecular crystals which are capable of electrocuting said pathogens via an electron transfer mechanism involving their molecular structure in the presence of oxidizing agents.

2. A method as claimed in claim 1 where the oxidizing agent is a persulfate.

3. A method as claimed in claim 1 where the concentration of the molecular crystals in the water is a maximum of one part per million.

4. A method as claimed in claim 2 where the concentration of the molecular crystals in the water is a maximum of one part per million.

* * * * *